United States Patent [19]
Blatt et al.

[11] Patent Number: 5,277,468
[45] Date of Patent: Jan. 11, 1994

[54] VACUUM CONTROL APPARATUS

[75] Inventors: John A. Blatt, 22 Stratton Pl., Grosse Pointe Shores, Mich. 48236; Wayne Morroney, Troy, Mich.

[73] Assignee: John A. Blatt, Grosse Pointe Shores, Mich.

[21] Appl. No.: 748,540

[22] Filed: Aug. 22, 1991

Related U.S. Application Data

[63] Continuation-in-part of Ser. No. 647,803, Jan. 30, 1991, abandoned.

[51] Int. Cl.$^5$ ............................................. B66C 1/02
[52] U.S. Cl. .................................. 294/64.2; 417/187
[58] Field of Search ........................... 294/64.2, 64.1; 417/187, 182, 189

[56] References Cited

U.S. PATENT DOCUMENTS

| | | | |
|---|---|---|---|
| 2,934,086 | 4/1960 | Blatt | 137/560 |
| 3,181,563 | 5/1965 | Giffen | 137/596 |
| 3,349,927 | 10/1967 | Blatt | 214/1 |
| 3,568,959 | 3/1971 | Blatt | 294/64 |
| 3,613,904 | 10/1971 | Blatt | 214/1 BV |
| 3,716,307 | 2/1973 | Hansen | 417/191 |
| 4,089,622 | 5/1978 | Aubel et al. | 417/188 |
| 4,417,312 | 11/1983 | Cronin et al. | 364/510 |
| 4,453,755 | 6/1984 | Blatt et al. | 294/64 |
| 4,655,692 | 4/1987 | Ise | 417/187 |
| 4,679,583 | 7/1987 | Lucas et al. | 137/84 |
| 4,750,768 | 6/1988 | Kumar | 294/64.1 |
| 4,777,383 | 10/1988 | Waller et al. | 307/118 |
| 4,828,306 | 5/1989 | Blatt | 294/64.1 |
| 4,865,521 | 9/1989 | Ise et al. | 294/64.2 X |
| 4,950,016 | 8/1990 | Kumar | 294/64.2 |
| 4,957,318 | 9/1990 | Blatt | 294/64.1 |

FOREIGN PATENT DOCUMENTS

| | | |
|---|---|---|
| 2559851 | 8/1985 | France . |
| 1049404 | 10/1983 | U.S.S.R. . |
| 1134521 | 1/1985 | U.S.S.R. . |

Primary Examiner—Joseph D. Pape
Attorney, Agent, or Firm—Basile and Hanlon

[57] ABSTRACT

A vacuum control apparatus is positioned remote from the vacuum operated work holding devices themselves, thereby allowing for a remote control system over a plurality of vacuum operated work holding devices. The apparatus also provides the ability to increase the vacuum flow rate available to the vacuum operated work holding devices within the system by increasing the number of vacuum generating venturis engaged in the system. The apparatus includes a venturi manifold and a plurality of venturi nozzles in fluid communication with the manifold. A venturi control valve controls the flow of pressurized air into the manifold and venturi nozzles. The system is fluidly connected to vacuum operated work holding devices by various passages and ports in the manifold. The manifold, venturi valve and venturi nozzles are stackable in two different ways. When the manifolds are stacked in the same orientation with respect to one another, the central vacuum passages communicate with one another to provide the ability to increase vacuum flow rate and thereby to decrease system response time. When the manifolds are stacked in a rotated orientation with respect to one another, the central passages are independent of one another to provide two separate, independently controlled vacuum systems.

26 Claims, 4 Drawing Sheets

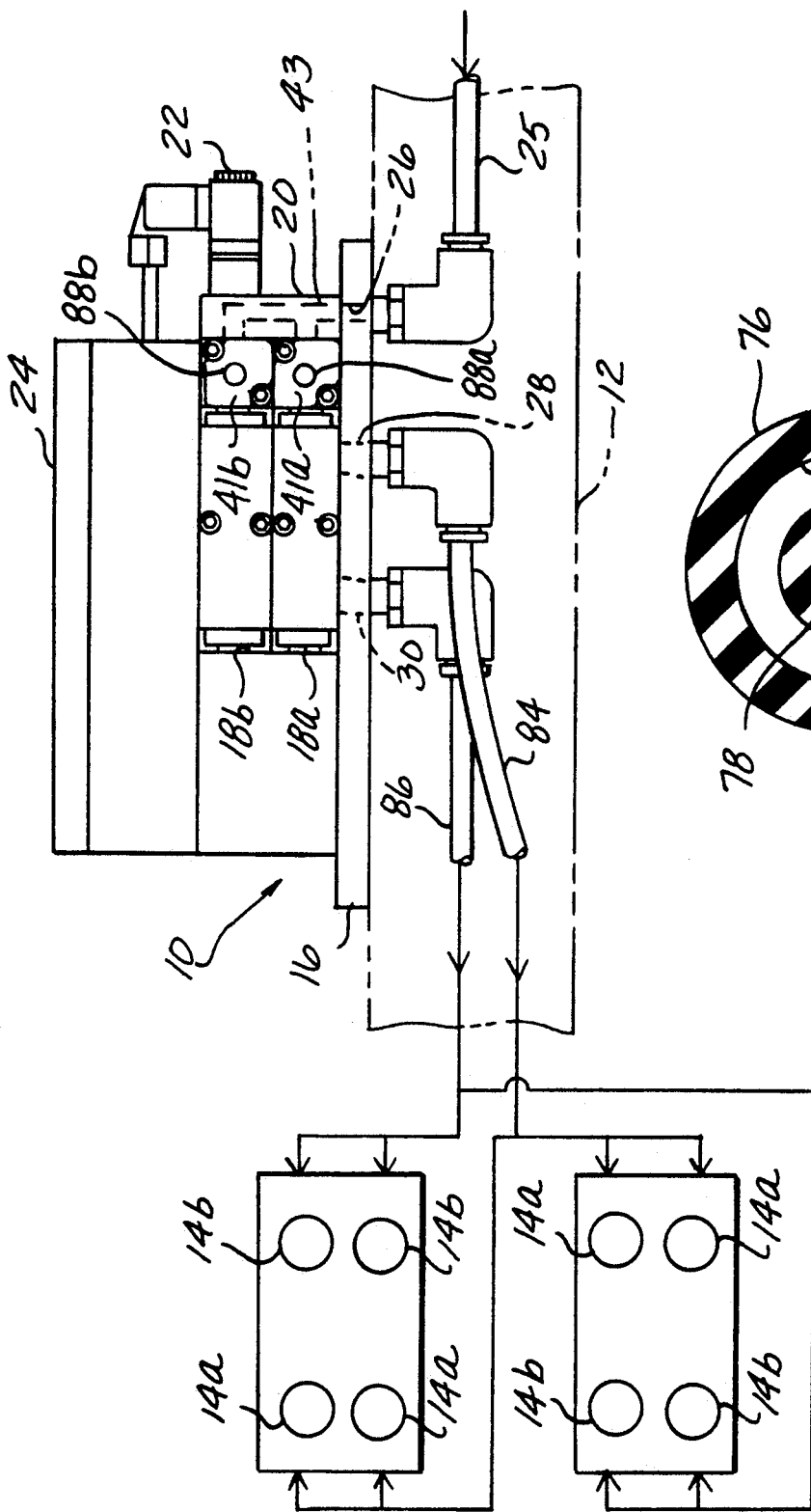

VACUUM CONTROL APPARATUS

RELATED APPLICATIONS

This application is a continuation-in-part of co-pending application Ser. No. 07/647,803, filed on Jan. 30, 1991, now abandoned.

FIELD OF THE INVENTION

The present invention relates generally to a vacuum control apparatus for generating and controlling a source of vacuum from a source of pressurized air, and more particularly, the vacuum control apparatus for applying sub-atmospheric pressure to a vacuum operated work holding device and for subsequently releasing the vacuum from the vacuum operated work holding device.

BACKGROUND OF THE INVENTION

Vacuum operated work holding devices are commonly employed as workpiece gripping elements to engage and transport a workpiece in a manufacturing operation, to load and unload sheet metal parts into and from a die, or to carry a part, such as an automobile windshield, to the vehicle in which it is to be installed. Such vacuum operated work holding devices employ a control apparatus which uses a venturi passage in a body which is connected to a source of air under pressure. Air flow through the venturi passage induces a sub-atmospheric pressure in the throat of the venturi and in a passage connecting the venturi throat to the interior of the vacuum cup. This sub-atmospheric pressure will induce a vacuum within the cup when the cup engages a workpiece surface.

Prior control devices and vacuum cups included mechanical means for maintaining the vacuum in the cup. Further, mechanical means were used to inject air under pressure into the vacuum cup to rapidly release the vacuum between the vacuum cup and the workpiece. These mechanical vacuum and blow-off means are described in U.S. Pat. Application Ser. No. 07/645,135 filed Jan. 24, 1991 and U.S. Pat. Application Ser. No. 07/647,803 filed Jan. 30, 1991. Vacuum cup assemblies, such as the above-referenced patent applications, include a control apparatus which is attached directly to the vacuum cup itself. Although such an assembly is advantageous where singular vacuum cups are needed to transport a workpiece, such an assembly becomes burdensome where a plurality of vacuum cups must be simultaneously controlled to transport a workpiece. A further disadvantage of these and other vacuum cup devices is the inability to increase the vacuum level or flow rate created by the apparatus itself. Thus, where a greater force is necessary to aid in transporting a heavy workpiece, additional vacuum cups, including their respective control devices, must be added to the material handling system.

SUMMARY OF THE INVENTION

The present invention seeks to overcome the perceived disadvantages of previously known control devices. The present invention includes an apparatus for generating and controlling a source of vacuum produced from a source of pressurized air that is positioned remote from the vacuum operated work holding devices themselves, thereby allowing for a remote control system over a plurality of vacuum operated work holding devices. The present invention also includes the ability to increase the vacuum flow rate available to the vacuum operated work holding devices within the system by increasing the number of venturis engaged in the sub-atmospheric pressure generating system.

The vacuum control apparatus of the present invention includes venturi means for generating sub-atmospheric pressure in response to flow of pressurized air. First valve means can selectively supply a flow of pressurized air to the venturi means. Manifold passage means connect at least two venturi means to one another. The manifold passage means includes first and second passages, wherein the first passage connects the venturi means to the source of pressurized air through the first valve means and the second passage is connected to the sub-atmospheric pressure region of the venturi means. Second valve means can selectively supply a flow of pressurized air to the second passage for rapidly releasing the vacuum between the vacuum operated work holding device and the workpiece. Valve control means can selectively control the first and second valve means.

The manifold passage means preferably includes two vertically extending passageways. A horizontal passageway has a first port on a front surface and communicates with one of the vertical passageways. The horizontal passageway branches to connect to a venturi port on both side surfaces of the manifold passage means. The venturi ports connect to the sub-atmospheric pressure region of venturi means connected on both sides of the manifold passage means. A second independent horizontal passage within the manifold means connects a second port formed in the front surface of the manifold passage means to venturi pressurized air inlet ports on both side surfaces of the manifold passage means. Of course, the passages may be disposed in any desired orientation with one another and the terms vertical and horizontal are used for the sake of description and clarity, rather than as words of limitation. It should be clear to those skilled in the art that the passages may be placed in any physical orientation desired, that is to say that the device may be placed with the vertical passages in the horizontal orientation, and the horizontal passages in the vertical orientation without affecting the operation of the apparatus.

A plurality of manifold passage means can be stacked one on top of another interconnecting the vertical passageways with one another. If all of the manifolds are stacked in the same orientation, the sub-atmospheric pressure regions of the venturi means will be in communication with one another through a single vertical passage. If it is desired to have two separate independent sub-atmospheric pressure systems, this can be accomplished by rotating the manifold passage means 180 degrees with respect to a vertical axis parallel to the vertical passageways. In this way, a portion of the venturi means are in communication with one another through the first vertical passage, while another portion of the venturi means are in communication with one another through the second vertical passage and the two vertical passages remain separate and independent of one another. If it is desired to have the first and second pressurized air inlet ports from the first and second valve means respectively, disposed on a front face of the manifold means, the first and second passages may be designed slightly differently from one another depending on the orientation that the manifold passage means will be disposed in.

A plurality of venturi nozzles are located on either side of the venturi manifold and are in fluid communication with the manifold. The nozzles are aligned in series, the first being a primary nozzle cartridge with a primary receiver cartridge placed directly downstream of the primary nozzle cartridge to create a sub-atmospheric pressure or vacuum region between the primary nozzle and receiver cartridges. A secondary nozzle is formed downstream of the primary receiver cartridge and a secondary receiver cartridge is aligned directly downstream of the secondary nozzle to create a second sub-atmospheric pressure or vacuum region between the secondary nozzle and receiver cartridge as the air continues to flow along the venturi path. This sub-atmospheric pressure is relayed to the vacuum operated work holding devices through the passages in the manifold passage means.

The present invention is a highly advanced electro-pneumatic management system. It combines a uniquely designed compressed air driven vacuum generator with an intelligent vacuum monitoring and control module. Material handling capability is enhanced through the use of dual channel vacuum control, continuous vacuum level monitoring, part present sensing and automatic vacuum level compensation. The present invention conserves compressed air with dual channel adjustable vacuum levels, so that only the required amount of vacuum is applied to the part. The present invention also ensures safe part handling through the automatic vacuum level monitoring feature, which instantly maintains the correct vacuum level with minimum usage of air. System response time is enhanced through the twin multi-stage vacuum generators, which provide selected vacuum to the work holding device. The vacuum level in the system is automatically held within the system to allow the vacuum generators to be turned off, and then used only to maintain the selected vacuum level. The present invention can sense when a part has been picked up with an integrated electronics module. This completely eliminates the requirement for proximity switches, which correspondingly reduces both system complexity and system cost. A silencer and filter module combines both a high efficiency exhaust silencer and particle filter. Compressed air exiting the present invention can be quieted by −30 dba, and suspended particles larger than 40 microns can be trapped by a replaceable filter element. This combination provides a safer and more productive work environment.

The integral electronic control is designed to be interfaced with programmable logic controllers, switches or relays. This provides a friendly and cost-effective method of vacuum management. An advanced forced vacuum disruption feature assures part separation from all vacuum devices, such as cups. This is particularly useful when working with fragile or light weight parts. The dual channel feature ensures additional part handling safety, as well as providing increased part manipulation. One channel can provide backup, or have a delayed part release sequence to aid in part presentation.

The control apparatus of the present invention is positioned remote from the vacuum operated work holding device, such as vacuum cups, to allow for remote control over a plurality of work holding devices from a single central vacuum generation and control apparatus. The present invention provides the ability to increase the vacuum flow rate available to the work holding devices within the system by increasing the number of venturis engaged in the system.

The vacuum control apparatus includes a venturi manifold having opposing passages extending through the width of the manifold. A central passage traverses the parallel opposing passages and is in fluid communication with the opposing passages and an exterior air supply line. Two ports are located along a central axis of the manifold and extend perpendicular to the central passage along a vertical plane. One port is in fluid communication with the central passage and opposing horizontal passages. The other port extends through the manifold and is used to establish fluid communication with a second manifold which may be placed above or below this manifold.

A plurality of venturi nozzles are located on either side of the venturi manifold and are in fluid communication with the manifold, specifically with the opposing passages. The nozzles are aligned in series, the first beginning with a nozzle cartridge, passing into an intermediate cartridge placed directly downstream of the nozzle cartridge and subsequently discharging into a final cartridge to create vacuum between the three cartridges based on airflow therethrough. This sub-atmospheric pressure is relayed to the vacuum operated work holding devices through the opposing passages in the venturi manifold. A venturi control valve extends along one end of the manifold and nozzle systems. The venturi control valve includes opposing T-shaped cavities for slidingly supporting a pair of spring-biased, or fluid pressure biased, spools. The T-shaped cavities are connected by a central passage which extends between them. A flow passage is interposed between the T-shaped cavities and connected to a source of air under pressure at one end and an outlet vented to the venturi manifold and nozzle cartridges.

A manifold and solenoid operated valve mount can be disposed parallel to the venturi control valve. Solenoid operated valves can be mounted to the outside of the manifold and are used to activate the vacuum system or the blow-off system as applied to the vacuum operated work holding devices. The manifold includes an inlet port in direct communication with the external air supply line and outlet ports in communication with the venturi control valve. Vacuum lines extend from the two ports in the venturi manifold to a plurality of vacuum operated work holding devices. An air supply line extends from an external pressurized air source into the manifold and solenoid operated valve mount.

If it is desired to activate the vacuum operated work holding devices to transport a workpiece, pressurized air is fed from the air supply line into the manifold and solenoid operated valve mount. A solenoid operated valve activates the air flow from the manifold into the venturi control valve. The pressurized air enters the venturi control valve and forces the spring-biased, or compressed air biased, spools inwardly. In their resting state, the spools block the flow of air into or out of the venturi manifold. Therefore, movement of the spools inward opens up the air passages into the venturi manifold. The pressurized air is then allowed to flow through the nozzle cartridges to create vacuum in the manifold assembly. The remotely located vacuum operated work holding devices are in communication with the vacuum ports in the vacuum manifold by a series of vacuum lines. The sub-atmospheric pressure created in the nozzles is fluidly communicated to the vacuum operated work holding devices by the opposing and central passages in fluid communication with the port in the venturi manifold. It is foreseen that such a system can supply vacuum to four random vacuum operated work holding devices.

If it is desired to use more than four vacuum operated work holding devices, a second venturi manifold, nozzle cartridges and venturi control valve may be stacked directly on the first assembly. In this case, however, the venturi manifold is rotated 180° so that the opposing port has access to the vacuum force created within the second series of nozzles. A second manifold and solenoid operated valve mount is not necessary as the manifold is designed to access at least two stacked venturi systems. However, where several venturi systems may be stacked, the manifold and solenoid operated valve mount are able to be stacked, if required.

The second set of four random vacuum operated work holding devices have fluid communication with the control apparatus through a vacuum line connected to the second port of the first venturi manifold that is not in fluid communication with the central passage of the first venturi manifold. Since the second venturi manifold has been rotated 180°, this second port now is in fluid communication with the central passage of the second venturi manifold. In order to create a vacuum in the second series of vacuum operated work holding devices, a second series of solenoid operated valves are mounted on the manifold and solenoid operated valve mount to activate the second series of spools within the second venturi control valve. The pressurized air is then forced to flow through the second nozzle cartridge creating a sub-atmospheric pressure within the second venturi manifold. This sub-atmospheric pressure is communicated to the second port through the opposing passages and central passage of the second venturi manifold. If it is desired to increase the vacuum flow within one or all sets of vacuum operated work holding devices, additional venturi manifolds, nozzle cartridges and venturi control valve may continue to be stacked one on top of another to reach this desired effect. The venturi manifold may be rotated as desired to access the first or second common ports.

The vacuum control apparatus of the present invention overcomes many of the deficiencies found in previously devised vacuum control apparatus. The vacuum control apparatus of the present invention is located remotely from the vacuum-operated work holding devices thereby providing a system that controls a plurality of vacuum-operated work holding devices simultaneously, or individually, as desired. The vacuum control apparatus of the present invention also provides means for increasing the number of vacuum-operated work holding devices controlled by the system and increasing the amount of vacuum flow through the vacuum-operated work holding devices.

Other advantages and features of the present invention will become more apparent from the following detailed description when read in conjunction with the accompanying drawing.

BRIEF DESCRIPTION OF THE DRAWING

The present invention will be more fully understood by reference to the following detailed description of the preferred embodiments of the present invention when read in conjunction with the accompanying drawing, in which like reference numerals refer to like parts throughout the various views, and where the letter designations *a* or *b* when appended to the various reference numerals indicate multiple like parts within a single view for purposes of clarity, and in which:

FIG. 1 is a front view illustrating a preferred embodiment of the present invention and includes a schematic view of a vacuum cup assembly;

FIG. 6 is a front cross-sectional view of a check valve used in the preferred embodiment.

DESCRIPTION OF THE PREFERRED EMBODIMENTS

Figures 2, 3:
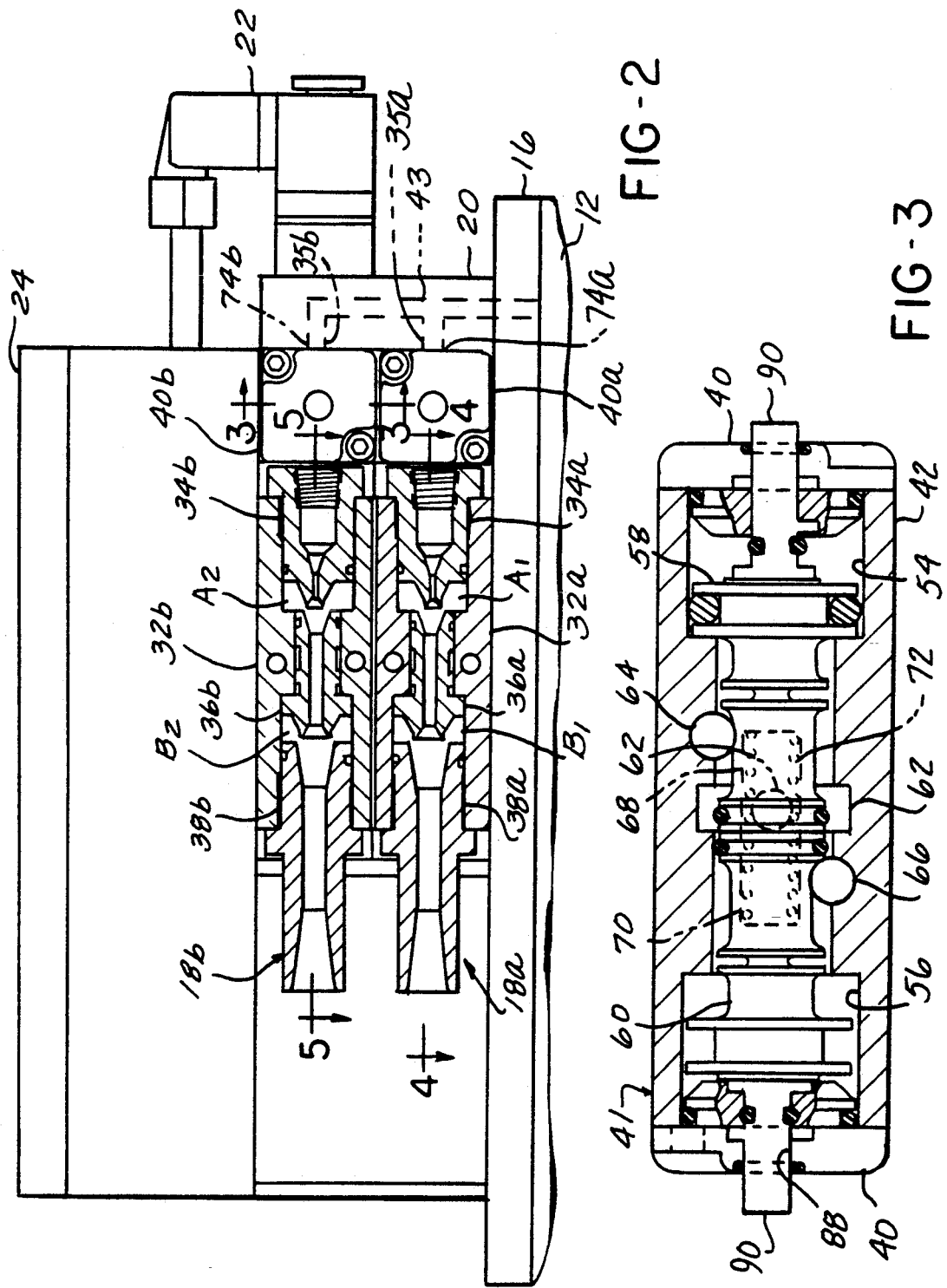
FIG. 2 is a front view of FIG. 1 showing a cross-section of the venturi assembly.
FIG. 3 is a cross-sectional view of the venturi control valve taken along lines 3—3 in FIG. 2.

A preferred embodiment of the vacuum control apparatus 10 of the present invention is shown in FIG. 1. The control apparatus 10 is shown mounted on a master boom assembly 12. However, it is envisioned that the control apparatus 10 may be located even more remotely from the vacuum operated work holding devices, such as vacuum cups 14*a*, 14*b*, for example in a remote control room setting. The control apparatus 10 is mounted on the master boom 12 by a base 16. The base 16 supports a venturi assembly 18 and manifold 20. Preferably, four solenoid operated valves 22 are mounted on the manifold 20 and connected to electrical control means 24. Electrical control means 24, typically used in this system, is described in U.S. Pat. Application Ser. No. 07/645,135 filed Jan. 4, 1991 and incorporated herein by reference. FIGS. 1 and 2 show a single solenoid operated valve 22 mounted on manifold 20. In the preferred embodiment a plurality of solenoid operated valves may be mounted on manifold 20 in a side-by-side arrangement to create or blow off vacuum within venturi assembly 18. An external pressurized air supply line 25 fluidly connects pressurized air to manifold 20 by way of a port 26 in base 16. Vacuum operated work holding devices 14*a*, 14*b* are similarly in fluid communication with venturi assembly 18 by ports 28, 30 in base 16. The vacuum control apparatus 10 shown in FIG. 1 depicts two venturi assemblies 18*a*, 18*b*, one stacked on top of the other.

Figure 5:
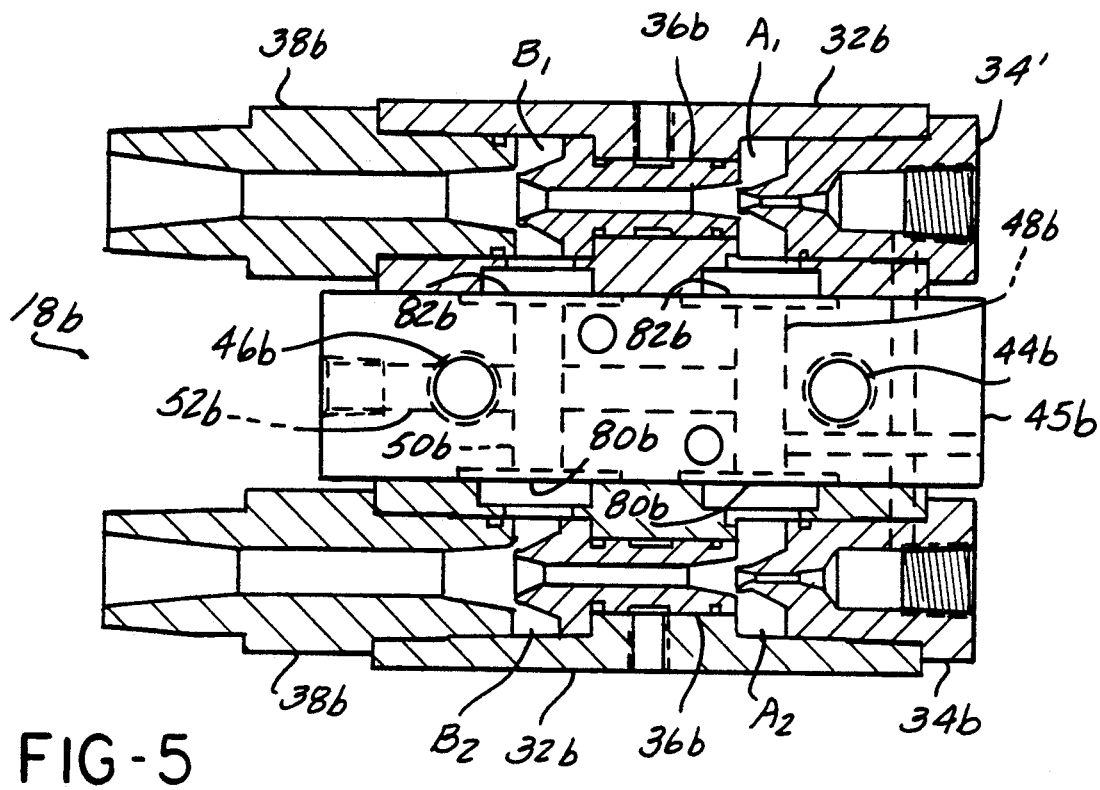
FIG. 5 is a cross-sectional view of the venturi assembly taken along lines 5—5 in FIG. 2.
Figure 4:
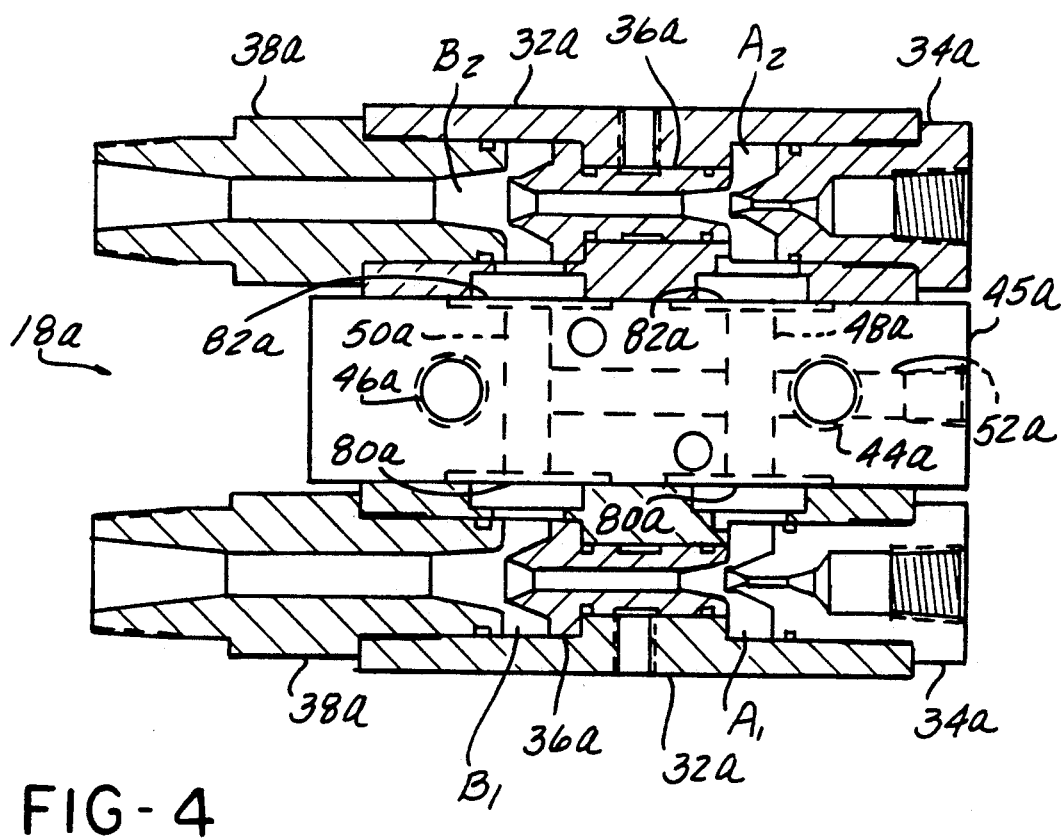
FIG. 4 is a cross-sectional view of the venturi assembly taken along lines 4—4 in FIG. 2.

A cut-away side view of the stacked venturi assemblies 18*a*, 18*b* is shown in FIGS. 2, 4 and 5. Each venturi assembly 18*a*, 18*b* includes a dual stage venturi body 32*a*, 32*b* for creating the required vacuum for proper operation of vacuum operated work holding devices 14*a*, 14*b*. Specifically, primary nozzle cartridge 34*a*, 34*b* is in fluid communication with pressurized air supply line 25 via passage 35*a*, 35*b* and solenoid operated valves 41*a*, 41*b*. A dual-stage primary receiver 36*a*, 36*b* aligns with primary nozzle cartridge 34*a*, 34*b* for receiving flow of pressurized air from nozzle cartridge 34*a*, 34*b*. Vacuum is created in area $A_1$, $A_2$ between primary nozzle 34*a*, 34*b* and primary receiver 36*a*, 36*b*. A secondary receiver cartridge 38*a*, 38*b* is aligned with primary receiver cartridge 36*a*, 36*b* for receiving flow of pressurized air directly from primary receiver 36*a*, 36*b*. A second source of vacuum is created between secondary receiver 38*a*, 38*b* and primary receiver 36*a*, 36*b* in area $B_1$, $B_2$. A check valve 76, shown in FIG. 6, is placed at both ends 80, 82 of opposing passages 48, 50.

Check valve 76 has a semi-circular aperture 77 defining a pivotal flap 78 for preventing air flow having an outer radius equal to or greater than the radius of passages 48, 50. When pressurized air flow ceases, vacuum within passages 48, 50 forces flap 78 of check valve 76 inwardly, blocking atmospheric pressure air flow into passages 48, 50. Check valve 76 prevents loss of vacuum from the vacuum operated work holding devices 14a, 14b, when the venturis 36, 38 are not operating to generate sub-atmospheric pressure. End caps 40a, 40b are disposed between venturi assembly 18a, 18b and manifold 20, and enclose the solenoid operated valves 41a, 41b. Each valve 41a, 41b includes a control valve 42 which is best seen in FIG. 3. Manifold 20 has a passage 43 for fluidly communicating pressurized air supply line 25 (FIG. 1) with venturi assembly 18a, 18b via valve 41a, 41b and passageways 35a, 35b as can be seen in FIG. 2.

Figure 7:
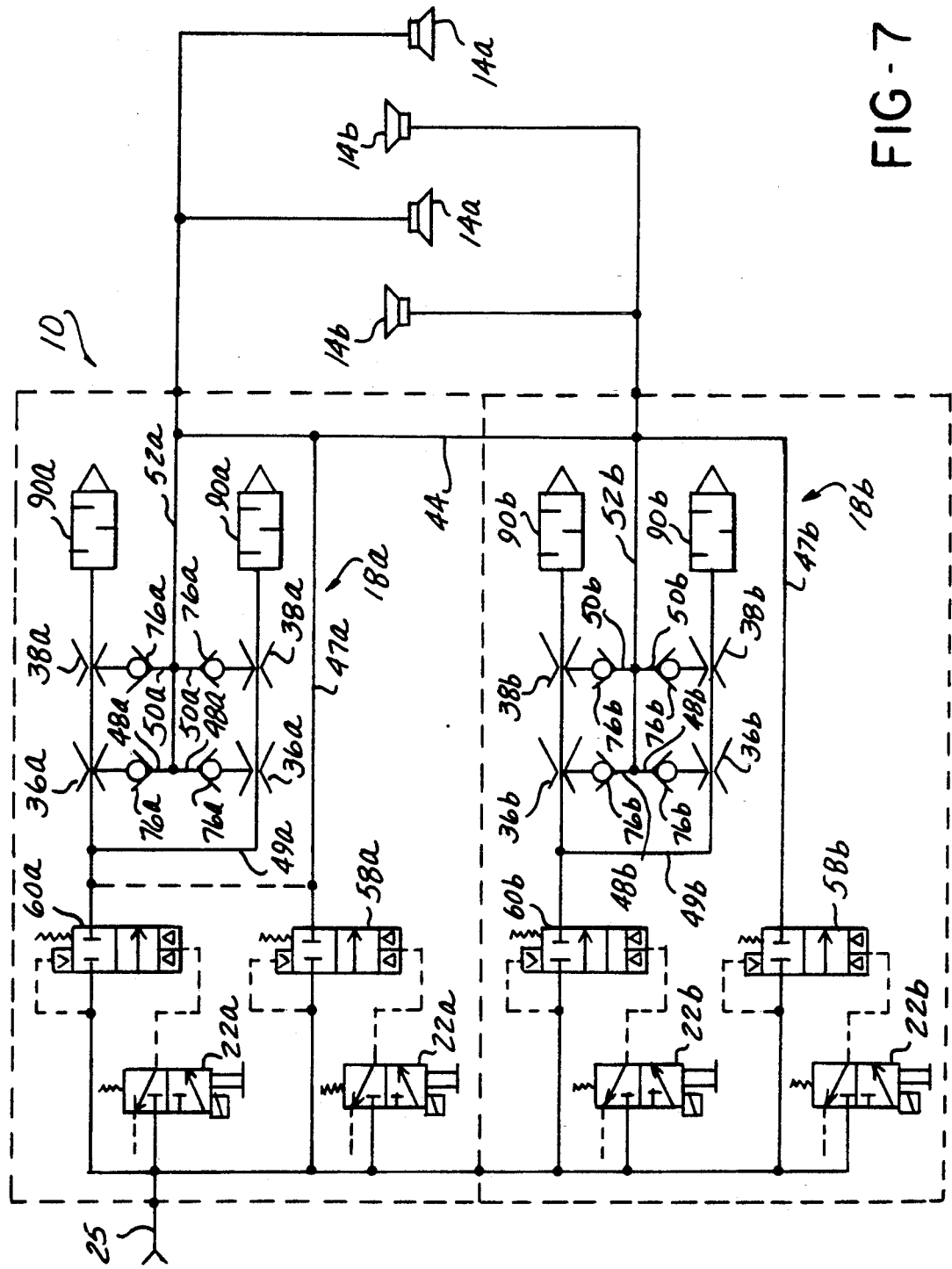
FIG. 7 is a schematic view of the vacuum control apparatus in a parallel configuration to provide faster response time by increasing the vacuum flow rate available.

With reference now to FIGS. 3 through 5, various cross-sectional views of the venturi assembly 18a, 18b are shown. Specifically, FIG. 4 is a cross-section of the venturi assembly 18 taken as shown in FIG. 2. FIG. 5 is a cross-section of the venturi assembly taken as shown in FIG. 2. FIG. 4 shows a venturi manifold 45 having two central ports 44, 46. Opposing passageways 48, 50 extend perpendicular to ports 44, 46 and are in fluid communication with the dual-stage venturi body 32. A central passage 52 extends perpendicular to opposing passageways 48, 50 and is in fluid communication with the venturi control valve 42 via passage 47a, 47b (FIG. 7). Central passage 52 is also fluidly connected to opposing passageways 48 and 50 and singular port 44. Ports 44, 46 are in fluid communication with the vacuum lines leading to vacuum operated work holding devices 14a, 14b through ports 28, 30 in base 16.

FIG. 3 shows a solenoid operated valve 41 including venturi control valve 42 having opposing T-shaped cavities 54, 56 for respectively slidingly supporting spools 58, 60. A central passage 62 is in communication with pressurized air via passageway 43 and connects with cavities 54, 56, and fluidly communicates valve body 42 with the venturi assembly 18a, 18b by way of ports 64, 66 to passages 47a, 47b and 49a, 49b respectively. Opposing blind bores 68, 70 in spools 58, 60 form a seat for spring 72. The spools 58, 60 are outwardly-biased against the interior of the end caps 40 by suitable means, such as spring biasing means or compressed air biasing means. In this position, the spools 58, 60 block ports 64, 66 from fluid communication with central passage 62, thereby preventing fluid flow through these passages. FIG. 3 shows spool 60 in a closed position blocking fluid communication between port 66 and central passage 62. Spool 58 is shown in FIG. 3 in an open position to allow fluid communication between port 64 and central passage 62 for passage into the venturi assembly 18 via passage 49. Mount ports 74a, 74b, shown in FIG. 2, fluidly communicate central passage 62 with manifold passage 43.

With reference now to FIG. 5, a second venturi assembly 18b is shown with the venturi manifold 45b rotated 180° from the manifold shown in FIG. 4. Rotating the manifold 45b gives fluid communication to central port 46b with the dual-stage venturi body 32b and the vacuum created in areas $A_1$, $A_2$ and $B_1$, $B_2$ of the venturi assembly 18b. The venturi manifold 45b is symmetrical, therefore, when one manifold is stacked on top of another, fluid communication is continued through ports 44b, 46b into vacuum lines leading to the vacuum operated work holding devices 14b. To create vacuum within the vacuum operated work holding devices 14a, 14b, pressurized air is supplied through line 25 into the manifold and solenoid operated valve mount. Electrical control means 24 activate one of the solenoid operated valves 22 to allow pressurized air to flow via passages (not shown) to one of the spool ends 58 or 60. One of the spools 58, 60 is forced inwardly revealing one of the ports 64 or 66. Movement of the spools 58 and 60 control the operation of the vacuum generating venturis and the positive release of vacuum or "blow-off." For example, port 64 can activate the vacuum line, while the opposing port 66 can send pressurized air to the vacuum operated work holding devices to positively release or "blow-off" the part.

Therefore, for example, with reference to FIGS. 2 through 4, if port 64 is the vacuum line to the venturi assembly 18, then solenoid operated valve 22 would force pressurized air on spool 58 associated with port 64. Pressurized air flows through the venturi control valve 42 and is directed via passageway 45 into primary nozzle cartridge 34. The pressurized air continues through the primary nozzle cartridge 34 into the dual stage primary receiver 36 and secondary receiver 38 creating sub-atmospheric pressure at points $A_1$, $A_2$ and $B_1$, $B_2$.

Opposing passageways 48, 50 transmit this vacuum flow to central port 44. Central port 44 is in fluid communication with four randomly located vacuum operated work holding devices 14a by vacuum line 84 as shown in FIG. 1. Check valve 76 maintains vacuum within the assembly 18 after the flow of pressurized air is terminated, typically in response to achieving the desired vacuum level for part engagement.

If a second set of vacuum operated work holding devices 14b are desired to be controlled by the apparatus 10, then a second venturi assembly 18b may be stacked upon first venturi assembly 18. To keep venturi assemblies 18a, 18b level, the exterior surface of the whole venturi assembly, including venturi control valve 42, is planar.

FIG. 5 shows venturi manifold 45b rotated 180° from venturi manifold 45a shown in FIG. 3. Venturi control valve 42b is activated by solenoid operated valve 22b to allow fluid flow of the pressurized air through port 64b. The vacuum created in areas $A_2$ and $B_2$ is fluidly communicated to central port 46b, rather than central port 44b because the manifold 45b has been rotated.

Since manifold 45b is, or can be, generally symmetrical to manifold 45, fluid communication is established to vacuum operated work holding devices 14b by central port 46b through central passage 46 and vacuum line 86.

Check valve 76b prevents loss of vacuum from venturi manifold 45b. If it is desired to increase the vacuum flow rate supplied to vacuum operated work holding device 14a, 14b, then manifold 45b is not rotated 180°. Instead, manifold 45b is stacked directly above manifold 45a in the identical direction, thereby communicating ports 44a and 44b with the vacuum created in areas $A_1$, $A_2$, $B_1$, $B_2$ of both manifolds 45a and 45b. It is envisioned that stacking a plurality of venturi assemblies 18 can be done to provide an increased vacuum flow rate to a plurality of vacuum operated work holding devices in a single group, or to provide different vacuum flow rates, or vacuum levels, to a plurality of vacuum operated work holding devices in two or more groups when one or more manifolds are rotated 180° with respect to the remaining manifolds.

To "blow off" the vacuum in the vacuum operated work holding devices 14a, 14b, electrical control means 24 activates a second solenoid operated valve 22 mounted on manifold 20. Solenoid operated valve 22 causes spool 60 to move inwardly by forcing pressurized air on the end of spool 60. This allows fluid communication between central passage 62 and port 66, and the venturi assembly 18 via passageway 47a, 47b.

The pressurized air fluidly communicates with central passages 44 and/or 46 through central passage 52 from venturi control valve 42. The pressurized air flows through the vacuum lines 84 and/or 86 to vacuum cups 14a, 14b and "blows off" the suction created between the vacuum cups 14 and the workpiece.

Each end cap 40a or 40b can incorporate an aperture 88a ir 88b which houses a manual override actuator 90, as illust on the left-hand side of FIG. 3. The actuator 90 may be pushed inward to manually actuate spool 58 or 60 to supply pressurized air to manifold 45a or 45b, if necessary to bypass a malfunctioning solenoid operated valve 22.

Referring now to FIG. 7, a schematic diagram of the vacuum control apparatus according to the present invention is shown. The pressure supply line 25 provides a source of pressurized air to the solenoid operated valves 22 and to the spools 58a, 58b, 60a, and 60b of the venturi manifolds 45a and 45b. The solenoid operated valves 22 are controlled in response to signals sent from the electrical control means 24 and actuate the spool movement within the venturi manifolds 45a and 45b in response to those signals. Upon actuation of spool 60a or 60b, pressurized air from line 25 is supplied to the primary nozzle cartridges for discharge through the primary receiver cartridges 36a, 36b and the secondary receiver cartridges 38a and 38b. Flow of pressurized air through the primary nozzle cartridges and the primary and secondary receiver cartridges creates areas of sub-atmospheric pressure or vacuum at $A_1$, $A_2$, $B_1$, $B_2$. Central passages 52a and 52b communicate with the areas of sub-atmospheric pressure for delivery to the vacuum operated work holding devices, such as vacuum cups 14a and 14b. When the pressurized air flow is terminated, passages 52a and 52b are isolated from the areas of sub-atmospheric pressure generation by check valves 76a and 76b. Pressurized air passing through the secondary receiver cartridge 38a and 38b are received within the combined silencer and filtration modules 90a and 90b. The configuration shown in FIG. 7 is for parallel operation of the two venturi assemblies 18a and 18b, where the vacuum flow rate is combined by interconnection through passage 44. Of course, it should be apparent that by rotating the venturi manifold 45a or 45b by 180° with respect to the other venturi manifold, the interconnection through passage 44 could be eliminated to provide two independent sources of sub-atmospheric pressure, which could then be controlled independently of one another, such as to provide different levels of vacuum as desired. When spool 60a or 60b has been returned to its normally closed position, and the part or workpiece has been transported to a desired location by attachment to the vacuum cups 14a and 14b, appropriate control signals can be sent to the solenoid operated valve 22 to actuate spool 58a and/or 58b to send a pulse of pressurized air through line 47a and/or 47b to positively release the part or workpiece from the vacuum cups or other vacuum operated work holding devices 14a and 14b.

In operation, an input control signal is provided to the electrical control means 24 to initiate the generation of vacuum. In response to the input control signal, the appropriate solenoid control valve 22 is actuated to begin flow of pressurized air through the primary nozzle cartridge, primary receiver cartridge and secondary receiver cartridges. The electrical control means 24 can be set to maintain a desired vacuum level for a predetermined period of time. As pressurized air flows through the primary nozzle cartridges, primary and secondary receiver cartridges, sub-atmospheric pressure is produced in the passages 52a and 52b which communicate via central passages 44 and/or 46 to the vacuum operated work holding devices 14a and/or 14b. Upon reaching a predetermined level of vacuum, the pressurized air supplied to the primary nozzle cartridge is terminated. Depending on how well the system is sealed, some vacuum leakage may occur. When the vacuum level drops, for example two inches below the preset level, the vacuum generators are switched on again until the preset level of vacuum has been reached. The vacuum control apparatus will continue this cyclic function until the time limit for the vacuum-on cycle has been reached. A part present indicator means is provided so that as the vacuum is cycled on, the indicator signals when the feedback system vacuum level is reached. The indicator remains on until the feedback system vacuum level indicates that the part has been released. As previously mentioned, the vacuum generators, including the primary nozzle cartridge 34, primary receiver cartridge and secondary receiver cartridges 36 and 38 respectively, are switched on until the preset vacuum level is reached. The vacuum generators are then cycled on and off to compensate for any loss until the vacuum-on cycle time limit has been reached. Pressurized vacuum disruption means are also provided. The pressurized vacuum disruption means can include compressed air channeled into the system to ensure vacuum disruption and part release. Of course, vacuum development time and ability to hold vacuum are completely dependent on the volume of the system or vessel to be evacuated, the line pressure and system integrity.

From the above description, it can be seen that the present invention provides a vacuum control apparatus for controlling a plurality of vacuum operated work holding devices separately or simultaneously, used for transporting a workpiece. Each venturi assembly can be separately activated by solenoid operated valves to create vacuum within the vacuum operated work holding device, or to defeat vacuum by a blow off system activated by a separate solenoid operated valve to send a pulse of pressurized air into the vacuum line to positively dislodge a previously vacuum engaged workpiece. Further, since the assembly is stackable and reversible, the vacuum control apparatus can control the vacuum flow rate available to each group of independently controlled vacuum operated work holding devices as desired.

Having described the invention in detail with respect to the preferred embodiment, it should be apparent that many modifications will become apparent to those skilled in the art to which it pertains without deviation from the spirit of the invention as defined by the scope of the appended claims.

What is claimed is:

1. A vacuum control apparatus for generating and controlling a source of vacuum produced from a source of pressurized air for communication with at least one vacuum operated work holding device, the vacuum control apparatus comprising:

at least two venturi means for generating sub-atmospheric pressure in response to flow of pressurized air;

first valve means for selectively supplying a flow of pressurized air to said venturi means;

manifold passage means for connecting said at least two venturi means to one another, said manifold passage means including a pressurized air passage and a vacuum passage, said pressurized air passage connecting said at least two venturi means to said source of pressurized air through said first valve means and said vacuum passage connected to said at least two venturi means for communicating said sub-atmospheric pressure with at least one vacuum operated work holding device, said manifold passage means further including at least one stackable passage for connecting a plurality of said manifold passage means to one another, said stackable passage extending through said manifold passage means with openings on each end for connection to another manifold passage means;

second valve means for selectively supplying a flow of pressurized air to said vacuum passage; and valve control means for selectively controlling said first and second valve means.

2. The apparatus of claim 1 further comprising:

check valve means disposed between said vacuum passage and said venturi means to prevent loss of sub-atmospheric pressure within said vacuum passage.

3. A vacuum control apparatus for applying and releasing vacuum to a vacuum operated work holding device engaging a workpiece, said vacuum control apparatus comprising:

means for creating sub-atmospheric pressure; and a venturi manifold having opposing vacuum passages for connection to said means for creating sub-atmospheric pressure, a central passage for connection to a source of air under pressure and at least one outlet passage, said central passage traversing the same plane as said opposing vacuum passages and in fluid communication with said opposing vacuum passages, and first and second passages extending through said venturi manifold perpendicular to said central passage and said opposing vacuum passages, said central passage in fluid communication with one of said first and second passages, and said first and second passages allowing stacking of one venturi manifold with respect to another venturi manifold such that said first and second passages extend through adjacent venturi manifolds, said venturi manifold disposed distal from said vacuum operated work holding device.

4. The apparatus of claim 3 wherein said vacuum control apparatus further comprises a venturi control valve disposed adjacent to an in fluid communication with said venturi manifold and said sub-atmospheric pressure means.

5. The apparatus of claim 4 wherein said vacuum control apparatus further comprises a manifold disposed adjacent to and in fluid communication with said venturi control valve and a source of air under pressure.

6. The apparatus of claim 5 wherein said vacuum control apparatus further comprises control means for controlling the selective application of vacuum to said vacuum operated work holding device and the application of pressurized air to said vacuum operated work holding device.

7. A vacuum control apparatus for applying and releasing vacuum to a vacuum operated work holding device engaging a workpiece, said vacuum control apparatus comprising:

means for creating sub-atmospheric pressure; and a venturi manifold having opposing vacuum passages connected to said means for creating sub-atmospheric pressure, a central passage connected to a source of air under pressure and an outlet passage, said central passage traversing the same plane as said opposing passages and in fluid communication with said opposing passages, and first and second passages extending through said venturi manifold perpendicular to said central passage and said opposing passages, said central passage in fluid communication with one of said fist and second passages, said venturi manifold disposed distal from said vacuum operated work holding device, wherein said sub-atmospheric pressure means includes a dual-stage venturi body disposed on either side of said venturi manifold for supporting said sub-atmospheric pressure means, a primary nozzle cartridge disposed within said dual-stage venturi body in fluid communication with said opposing central passages and a primary receiver cartridge disposed within said dual-stage body in fluid communication with said primary nozzle for producing a first region of sub-atmospheric pressure between said primary receiver and said primary nozzle in response to flow of pressurized air therethrough.

8. The apparatus of claim 7 wherein said sub-atmospheric pressure means further comprises:

a secondary receiver cartridge disposed within said dual-stage body in fluid communication with said primary receiver for producing a second region of sub-atmospheric pressure between said secondary receiver and said primary receiver in response to flow of pressurized air therethrough.

9. The apparatus of claim 4 wherein said venturi control valve further comprises:

a first flow passage through said valve body;

first and second opposing T-shaped cavities extending from the ends of said valve body;

a flow passage interposed between said opposing cavities and connected to a source of air under pressure; and first and second outwardly-biased spools housed within said first and second T-shaped cavities respectively for regulating flow of said pressurized air between first and second outlet ports.

10. The apparatus of claim 9 wherein said venturi control valve further comprises:

end cap means for securing each of said spools within said respective T-shaped cavity, said end cap means including a manual actuator for manual application of pressurized air.

11. The apparatus of claim 3 wherein said venturi manifold further comprises check valve means for maintaining said sub-atmospheric pressure within said vacuum operated work holding device.

12. The apparatus of claim 6 wherein said control means comprises a plurality of solenoid operated valves mounted on said manifold.

13. A vacuum control apparatus for applying and releasing vacuum to a vacuum operated work holding device engaging a workpiece, said vacuum control apparatus comprising:

a venturi manifold having opposing vacuum passages for connection to means for creating sub-atmospheric pressure, a central passage traversing a common plane with said opposing vacuum passages and in fluid communication with said opposing vacuum passages, and first and second passages extending through said venturi manifold perpendicular to said central passage and said opposing vacuum passages, said venturi manifold stackable along an axis parallel with said first and second passages such that when one venturi manifold is stacked on top of another venturi manifold said first and second passages of said one venturi manifold are in fluid communication with respective first and second passages of said other venturi manifold for increasing vacuum flow created by said sub-atmospheric pressure means and supplied to said vacuum operated work holding device.

14. The apparatus of claim 13 wherein said vacuum control apparatus further comprises a venturi control valve disposed adjacent to and in fluid communication with said venturi manifold and said sub-atmospheric pressure means.

15. The apparatus of claim 14 wherein said vacuum control apparatus further comprises a manifold disposed adjacent to and in fluid communication with said venturi control valve and a source of air under pressure.

16. The apparatus of claim 15 wherein said vacuum control apparatus further comprises control means for selectively controlling application of vacuum to said vacuum operated work holding device and application of pressurized air to said vacuum operated work holding device.

17. A vacuum control apparatus for applying and releasing vacuum to a vacuum operated work holding device engaging a workpiece, said vacuum control apparatus comprising:

a venturi manifold having opposing passages for connection to means for creating sub-atmospheric pressure, a central passage traversing a common plane with said opposing passages and in fluid communication with said opposing passages, and first and second passages extending through said venturi manifold perpendicular to said central passage and said opposing passages, said venturi manifold stackable along an axis parallel with said first and second passages for increasing vacuum flow created by said sub-atmospheric pressure means and supplied to said vacuum operated work holding device, wherein said vacuum sub-atmospheric pressure means includes a dual-stage venturi body disposed on either side of said venturi manifold for supporting said sub-atmospheric pressure means, a primary nozzle cartridge disposed within said dual-stage venturi body in fluid communication with said opposing and central passages and a primary receiver cartridge disposed within said dual-stage venturi body in fluid communication with said primary nozzle for producing a first region of sub-atmospheric pressure between said primary receiver cartridge and said primary nozzle in response to flow of pressurized air therethrough.

18. The apparatus of claim 17 wherein said sub-atmospheric pressure means further comprises:

a secondary receiver cartridge disposed within said dual-stage venturi body in fluid communication with said primary receiver for producing a second region of sub-atmospheric pressure between said secondary receiver cartridge and said primary receiver cartridge in response to flow of pressurized air therethrough.

19. The apparatus of claim 14 wherein said venturi control valve further comprises:

said venturi control valve having a first flow passage and first and second opposing T-shaped cavities extending from opposing ends of said valve body, said venturi control valve further having a flow passage interposed between said opposing cavities and connected to a source of air under pressure; and first and second outwardly-biased spools housed within said first and second T-shaped cavities respectively for regulating flow of said pressurized air between first and second passages respectively.

20. The apparatus of claim 19 wherein said venturi control valve further comprises:

end cap means for securing each of said first and second spools within said first and second T-shaped cavities, said end cap means including a manual actuator for manual application of pressurized air.

21. The apparatus of claim 13 wherein said venturi manifold further comprises check valve means for maintaining said sub-atmospheric pressure within said vacuum operated work holding device.

22. The apparatus of claim 16 wherein said control means comprises a plurality of solenoid operated valves mounted on said manifold.

23. A vacuum control apparatus assembly for applying and releasing vacuum to a vacuum operated work holding device engaging a workpiece, said vacuum control apparatus comprising:

a venturi manifold having opposing passages and a central passage traversing a common plane with said central passage in fluid communication with the opposing passages, and first and second passages extending through said venturi manifold perpendicular to said central passage and said opposing passages;

a base for supporting said vacuum control apparatus, said base having at least one port for connecting said vacuum operated work holding device to said sub-atmospheric pressure means;

a venturi control valve disposed adjacent to and in fluid communication with said venturi manifold and said sub-atmospheric pressure means, said venturi control valve having a valve body with a first flow passage through said valve body, first and second opposing T-shaped cavities extending from opposite ends of said valve body, a flow passage interposed between said opposing first and second T-shaped cavities and connected to a source of air under pressure, first and second outwardly-biased spools housed within said first and second T-shaped cavities respectively for regulating flow of said pressurized air between first and second passages respectively, end cap means for securing each of said first and second spools within said first and second T-shaped cavities, said end cap means including first and second manual actuators for manual application of pressurized air;

a manifold disposed adjacent to and in fluid communication with said venturi control valve and a source of air under pressure;

check valve means for maintaining said sub-atmospheric pressure within said vacuum operated work holding device;

control means for selectively controlling application of vacuum to said vacuum operated work holding device and application of pressurized air to said vacuum operated work holding device, said control means including a plurality of solenoid operated valves mounted on said manifold;

sub-atmospheric pressure means having a dual-stage venturi body disposed on either side of said venturi manifold;

a primary nozzle cartridge disposed within said dual-stage venturi body and in fluid communication with said opposing and central passages;

a primary receiver cartridge disposed within said dual stage venturi body and in fluid communication with said primary nozzle for producing a first region of sub-atmospheric pressure between said primary receiver cartridge and said primary nozzle in response to flow of pressurized air therethrough; and a secondary receiver cartridge disposed within said dual-stage venturi body and in fluid communication with said primary receiver cartridge for producing a second region of sub-atmospheric pressure between said secondary receiver cartridge and said primary receiver cartridge in response to flow of pressurized air therethrough.

24. The apparatus of claim 1 further comprising said manifold passage means allowing creation of more than one independent sub-atmospheric pressure systems, said manifold passage means including at least two venturi manifolds such that said at least one stackable passage includes first and second passages in each of said venturi manifolds, wherein a first venturi manifold is rotationally disposed at an angularly offset position with respect to an immediately adjacent second venturi manifold.

25. The apparatus of claim 24 wherein the angularly offset position is 180 degrees about an axis parallel to one of said first and second passages, such that said first passage of sad first venturi manifold is in fluid communication with said second passage of said immediately adjacent second venturi manifold and said second passage of said first venturi manifold is in fluid communication with said first passage of said immediately adjacent second venturi manifold.

26. The apparatus of claim 24 wherein said at least two venturi means are disposed in parallel fluid communication with respect to one another.

* * * * *